United States Patent
Wu et al.

(10) Patent No.: US 7,206,301 B2
(45) Date of Patent: Apr. 17, 2007

(54) SYSTEM AND METHOD FOR DATA COMMUNICATION HANDOFF ACROSS HETEROGENOUS WIRELESS NETWORKS

(75) Inventors: Po-Chung Wu, Taipei (TW); Yu-Te Chen, Kaoshiung (TW); Chih-Ming Chou, Taipei (TW)

(73) Assignee: Institute for Information Industry, Taipei (TW)

( * ) Notice: Subject to any disclaimer, the term of this patent is extended or adjusted under 35 U.S.C. 154(b) by 612 days.

(21) Appl. No.: 10/795,877

(22) Filed: Mar. 8, 2004

(65) Prior Publication Data

US 2005/0122941 A1    Jun. 9, 2005

Related U.S. Application Data

(60) Provisional application No. 60/526,622, filed on Mar. 12, 2003.

(51) Int. Cl.
*H04Q 7/24* (2006.01)
(52) U.S. Cl. ............... 370/338; 370/353; 370/401; 455/433; 455/426.1; 455/411
(58) Field of Classification Search ........ 455/433, 455/435.1, 436, 426.1, 426.2, 554.2, 411, 455/552.1, 557; 370/401, 230, 353, 352, 370/328, 338; 713/185
See application file for complete search history.

(56) References Cited

U.S. PATENT DOCUMENTS

| 6,259,914 B1 * | 7/2001 | Koster ................. 455/432.1 |
| 7,065,358 B2 * | 6/2006 | Verma et al. ............ 455/435.1 |
| 2002/0136226 A1 * | 9/2002 | Christoffel et al. ......... 370/401 |
| 2005/0114680 A1 * | 5/2005 | Chinnaswamy et al. .... 713/185 |
| 2005/0266853 A1 * | 12/2005 | Gallagher et al. .......... 455/439 |
| 2006/0068788 A1 * | 3/2006 | Zivkovic .................. 455/436 |

* cited by examiner

*Primary Examiner*—Temica Beamer
*Assistant Examiner*—Joy Contee
(74) *Attorney, Agent, or Firm*—Thomas, Kayden, Horstemeyer & Risley (57) ABSTRACT

A system and method of data communication handoff across heterogeneous wireless networks. A wireless telephony network comprises a base station system (BSS) and a visit location register (VLR). The BSS manages data communication in a cell. The VLR generates a temporary authentication identity applicable in the cell when a mobile terminal is successful authentication for data communication via the wireless telephony network, and transmits the temporary authentication identity to the mobile terminal. A wireless local area network (WLAN) located in the cell comprises an access point. The access point receives the temporary authentication identity from the wireless telephony network and authenticates the mobile terminal for data communication via the WLAN by verifying the temporary authentication identity upon the mobile terminal associates with the access point.

14 Claims, 6 Drawing Sheets

SYSTEM AND METHOD FOR DATA COMMUNICATION HANDOFF ACROSS HETEROGENOUS WIRELESS NETWORKS

CROSS-REFERENCE TO RELATED APPLICATIONS

This application claims priority to U.S. provisional application Ser. No. 60/526,622, filed on Mar. 12, 2003, titled "Handoff Management System And Method Thereof Across Heterogeneous Wireless Network".

BACKGROUND OF THE INVENTION

1. Field of the Invention

The present invention relates to data communication management; and particularly to a method and system for data communication handoff across heterogeneous wireless networks.

2. Description of the Related Art

Wireless telephony service providers offer not only voice calling but also General Packet Radio Service (GPRS) to enable the data packet transmission via a mobile terminal. Although GPRS is feasible in mobile data transmission, the transmission rates typically do not exceed 56 Kbs and the costs remain expensive. Advances in wireless local area network (WLAN) technology have led to the emergence of publicly accessible WLANs (e.g., "hot spots") at airports, cafes, libraries and other public facilities. The WLAN uses radio frequency transmission to communicate between roaming mobile terminals and access points (or base stations). The relatively low cost to implement and operate a WLAN, as well as the available high bandwidth (usually in excess of 10 Megabits/second) has made the WLAN an idea wireless access infrastructure.

"Cell" is the basic geographic unit of a wireless telephony system. A city or county is divided into smaller cells, each of which is equipped with a low-powered radio transmitter/receiver. The cells can vary in size depending on terrain, capacity demands, or other conditions. By controlling the transmission power, the radio frequencies assigned to one cell can be limited to the boundaries of that cell.

In a hybrid wireless communication environment, a cell may contain multiple WLANs. When a mobile terminal attaching to a wireless telephony network enters a WLAN in one cell, in the ideal situation, the data transmission is handled by the WLAN without disrupting the data communication. In order to accommodate wireless telephony networks and WLANs, Subscriber Identity Module (SIM) based authentication using Extensible Authentication Protocol Over LAN (EAPOL) has been introduced to provide a unified protocol for communication between different types of wireless networks. Although the solution is feasible, the interrogation information transmitted back and forth between a WLAN and a wireless telephony network is time consuming, and disruptive to data communication.

In view of the above limitations, a need exists for a system and method of data communication handoff to provide an efficient authentication mechanism for a hybrid wireless network environment.

SUMMARY OF THE INVENTION

It is therefore an object of the present invention to provide a system and method of data communication handoff to provide a pre-authentication mechanism for performing complicated authentication procedures when a mobile terminal associates with a BSS, enabling the mobile terminal to hand off data communication from a wireless telephony network to a WLAN within the same cell, with reduced authentication time.

According to a first embodiment of the invention, a mobile terminal initiates a data communication with a base station system (BSS) in a cell, an authentication request with an International Mobile Subscriber Identity (IMSI) stored in Subscriber Identity Module (SIM) card is sent to an authentication center (AUC) via the BSS and a Mobile Switching Center (MSC). Next, the AUC and mobile terminal authenticate each other using the Challenge/Handshake Authentication Protocol (CHAP).

After the authentication is successful, a Visit Location Register (VLR) generates a temporary authentication identity applicable in a corresponding cell. The VLR transmits the temporary authentication identity to the mobile terminal via the MSC, and the mobile terminal stores the temporary authentication identity on the SIM card. The VLR additionally transmits the VLR address and the temporary authentication identity to an Authentication, Authorization and Accounting (AAA) server via the HLR and an AAA-HLR gateway. The AAA server stores the temporary authentication identity and transmits it to access points (APs) associated with any Wireless Local Network (WLAN) within the cell.

When the mobile terminal enters a WLAN in the cell and associates with an AP therein, the mobile terminal sends the AP an Extensible Authentication Protocol over Wireless (EAPOW) start message. Next, the AP sends an EAP request to the mobile terminal for temporary authentication identity, and the mobile terminal sends an EAP response with temporary authentication identity stored in the SIM card to the AP. An EAP success message is sent to the mobile terminal upon successfully verifying the temporary authentication identity of the mobile terminal with that received from the VLR.

Following the first embodiment of the invention, the mobile terminal hands off the data communication from the BSS to a new BSS in a new cell, an authentication request with the temporary authentication identity stored in a SIM card is sent to the MSC via a new BSS and a new MSC corresponding to the new BSS, and authentication information with the IMSI corresponding to the mobile terminal, and a plurality of random numbers (RANDs) and signed responses (SRESs) is sent to the new MSC. Next, the new MSC and mobile terminal authenticate each other using CHAP.

After successful authentication, a new VLR generates a new temporary authentication identity applicable in the new cell. Next, the new VLR transmits the new temporary authentication identity to the mobile terminal via the new MSC, and the mobile terminal stores the new temporary authentication identity on the SIM card. The new VLR additionally transmits VLR address and the new temporary authentication identity to a new AAA server via the HLR and an AAA-HLR gateway. The AAA server stores the new temporary authentication identity and transmits it to access points (APs) associated with any WLAN within the new cell.

When the mobile terminal enters a WLAN in the new cell and associates with an AP therein, the mobile terminal sends the AP an EAPOW start message. Next, the AP sends an EAP request to the mobile terminal for new temporary authentication identity, and the mobile terminal sends an EAP response with new temporary authentication identity stored in the SIM card to the AP. An EAP success message is sent to the mobile terminal upon successfully verifying the new temporary authentication identity of the mobile terminal with that received from the new VLR.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
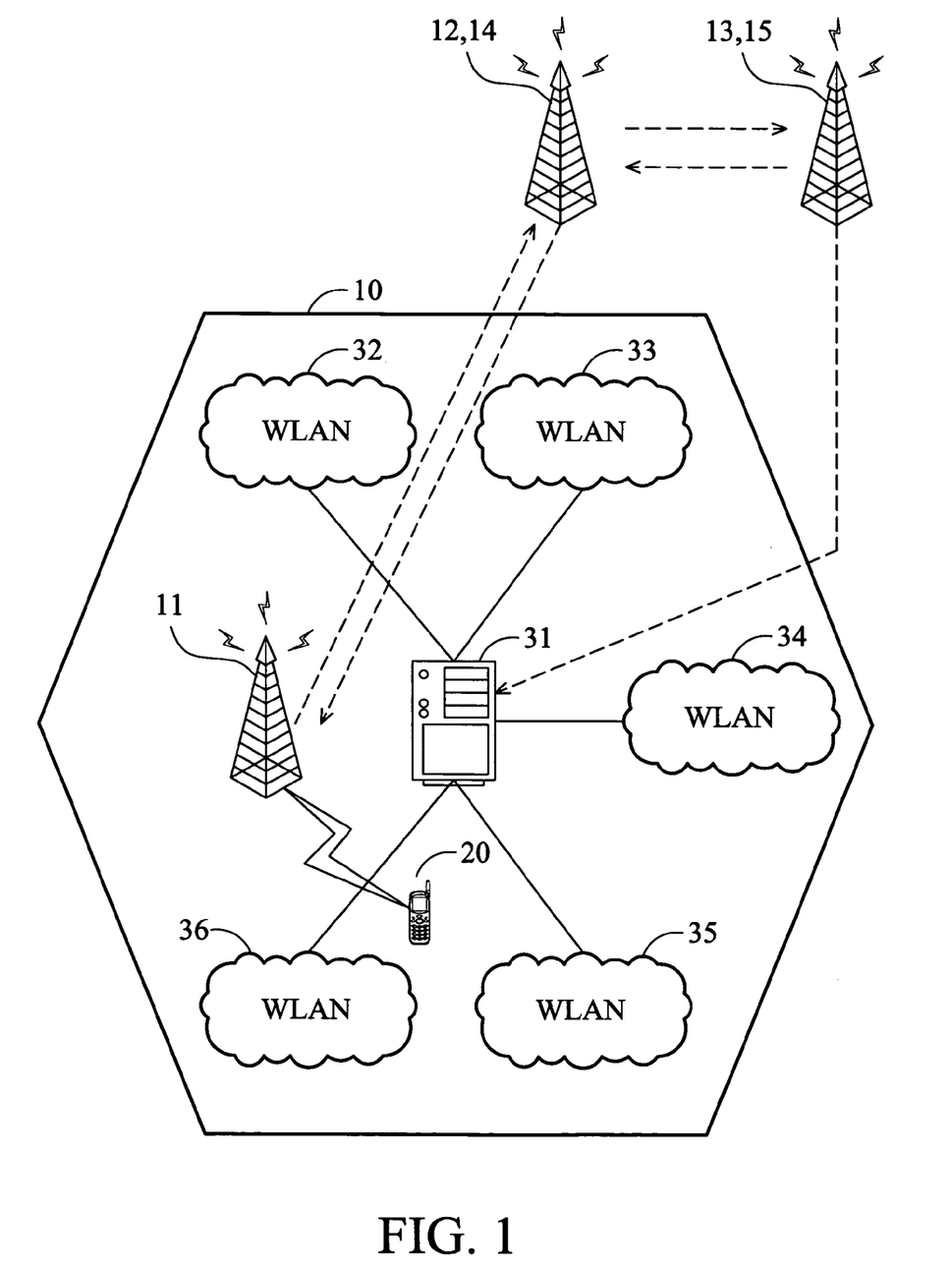
FIG. 1 is an architecture diagram of a hybrid wireless communication environment according to the first embodiment of the invention.

A first embodiment of the invention discloses a data communication handoff system and method thereof in a hybrid wireless communication environment when a mobile terminal initiates a data communication. FIG. 1 is an architecture diagram of a hybrid wireless communication environment according to the first embodiment of the invention. The environment comprises a base station system (BSS) 11, an Authentication, Authorization and Accounting (AAA) server 31, Wireless Local Area Networks (WLANs), ranging from 32 to 36, a Mobile Switching Center (MSC) 12, a Visit Location Register (VLR) 14, a Home Location Register (HLR) 13 and an Authentication Center (AUC) 15. The WLANs are located in the cell 10. The BSS 11 comprises a base transceiver station (BTS) and a base station controller (BSC). The BTS handles the radio interface to the mobile station 20 with the radio equipment, such as transceivers and antennas. The BSC provides the control functions, such as handoff, cell configuration data and control of radio frequency (RF) power levels in the BTS, and physical links between the MSC 12 and BTS. The MSC 12 performs the telephony switching functions of the wireless telephony system, and additionally performs such functions as toll ticketing, network interfacing, common channel signaling, or others. The AUC 13 provides authentication and encryption parameters that verify the mobile station identity and ensure the confidentiality of each call. The HLR database is used for storage and management of subscriptions. The home location register 15 stores permanent data about subscribers, including a subscriber's service profile, location information, and activity status. The VLR database contains temporary information about subscribers required by the MSC 12 in order to service visiting subscribers. When a mobile station 20 roams into the MSC area, the VLR 14 connected to the MSC 12 requests data about the mobile station 20 from the HLR 15, reducing the need for interrogation of the HLR 15.

Registration of the mobile terminal 20 typically involves authentication, authorization and accounting. The AAA server 31 is a server application that handles user requests for access to computer resources and provides AAA services. The AAA server 31 typically interacts with network access and gateway servers and with databases and directories containing user information. The preferable standard by which devices or applications communicate with a AAA server is the Remote Authentication Dial-In User Service (RADIUS). The AAA server 31 stores information regarding WLANs located in the cell 10. A WLAN is a type of local area network employing high-frequency radio waves rather than wires to communicate between mobile terminals. In a WLAN, an access point is a station that transmits and receives data, referred to as a transceiver. An access point connects mobile terminals within the WLAN and also can serve as the point of interconnection between the WLAN and a fixed wire network. Each access point can serve multiple mobile terminals within a defined network area; as mobile terminals move beyond the range of one access point, they are automatically handed over to the next one. A small WLAN may only require a single access point, and the number required increases as a function of the number of mobile terminals and the physical size of the WLAN.

Figure 2:
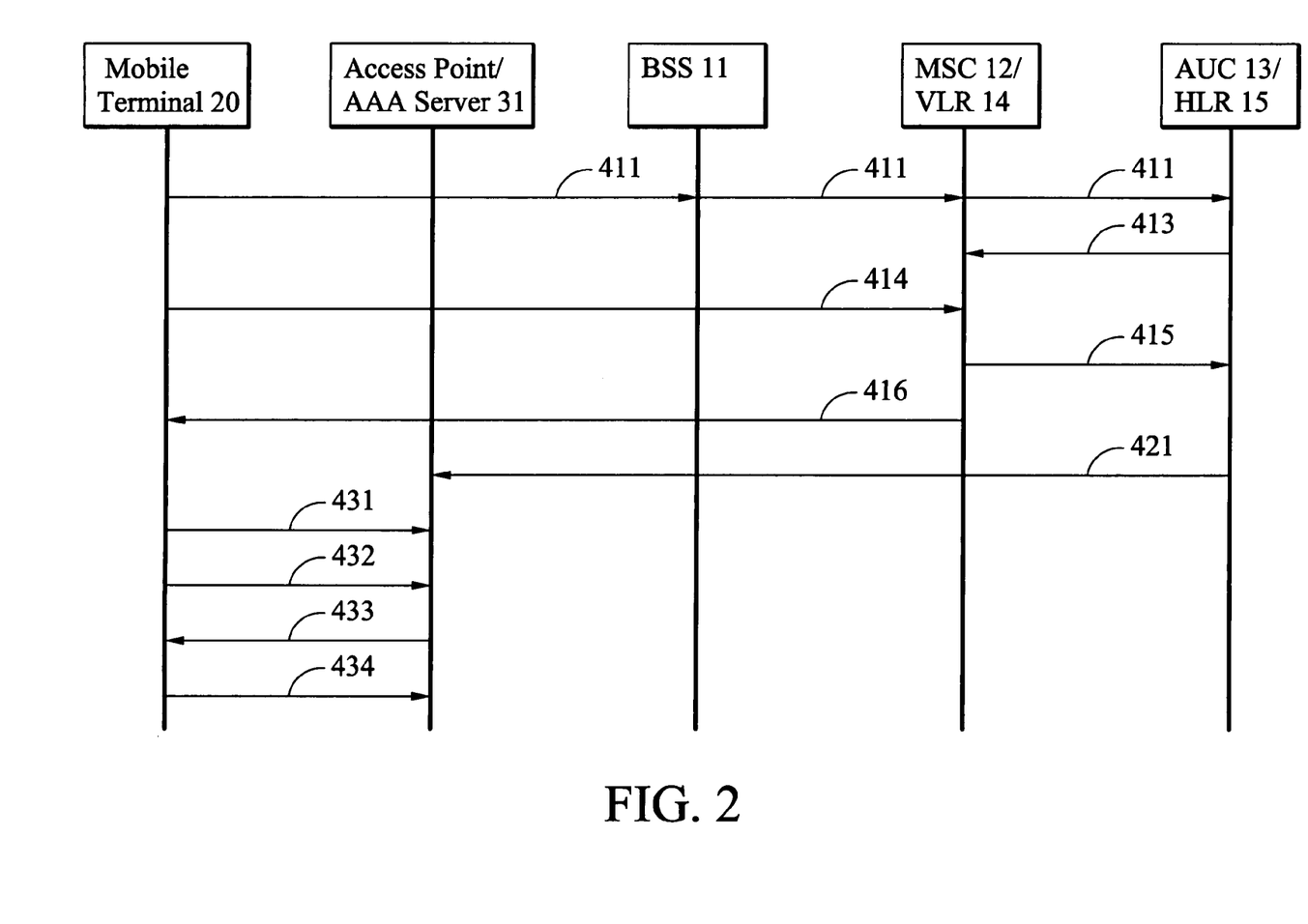
FIG. 2 is a communication sequence diagram of a hybrid wireless communication environment according to the first embodiment of the invention.

The accommodation of the wireless telephony network and the WLANs 32 to 36, allows the mobile terminal 20 to transition from one type of network to another. Thus, for example, the mobile terminal 20 may initiate a data communication session with the mobile telephony network through the BSS 11, and then transition to the WLAN, such as 32, 33, 34, 35 or 36. In order to provide smooth handoff of data communication from a wireless telephony network to a WLAN without disrupting the data connection, the first embodiment discloses a pre-authentication mechanism to reduce the authentication time. FIG. 2 is a communication sequence diagram of a hybrid wireless communication environment according to the first embodiment of the invention. When the mobile terminal 20 initiates data communication with the BSS 11 in the cell 10, an authentication request 411 with an International Mobile Subscriber Identity (IMSI), stored in a SIM card is sent to the AUC 13 via the BSS 11 and MSC 12. The AUC 13 generates authentication information 413 with a plurality of parameter triplets, each containing a random number (RAND), a signed response (SRES) and a cipher key (Kc), and sends it to the MSC 12. The mobile terminal 20 and the MSC 12 use Challenge/Handshake Authentication Protocol (CHAP) 414 to authenticate each other. After successful authentication, the VLR 14 generates a temporary authentication identity, preferably a Temporary Mobile Subscriber Identity (TMSI), which is only applicable in the cell 20. The association between the IMSI and the temporary authentication identity is stored in the VLR 14. It is noted that the identity of the subscriber cannot be acquired by listening to the radio channel, since the temporary authentication identity is only generated while the mobile terminal 20 is present in the cell 20, and can even be changed during this period (i.e., ID hopping). The VLR 14 transmits a message 416 comprising the temporary authentication identity to the mobile terminal 20 via the MSC 12, and the mobile terminal 20 stores the temporary authentication identity on the SIM card. The VLR 14 additionally transmits a message 415 comprising the VLR address and the temporary authentication identity to the HLR 13 via the MSC 12. The HLR 15 transmits a message 421 comprising the temporary authentication identity to the AAA server 31 for pre-registration via an AAA-HLR gateway (not shown), and the AAA server 31 stores the temporary authentication identity and transmits it to access points (APs) associated with any WLAN within the cell 20.

When the mobile terminal 20 enters a WLAN in the cell 10 and associates with an AP therein, the mobile terminal 20 sends the AP an Extensible Authentication Protocol over Wireless (EAPOW) start message 431. The AP sends an EAP request 432 to the mobile terminal 20 for temporary authentication identity, and the mobile terminal 20 sends an EAP response 432 with the temporary authentication identity to the AP. An EAP success message 433 is sent to the mobile terminal upon successfully verifying the temporary authentication identity of the mobile terminal 20 by that of the VLR 14.

Figure 3:
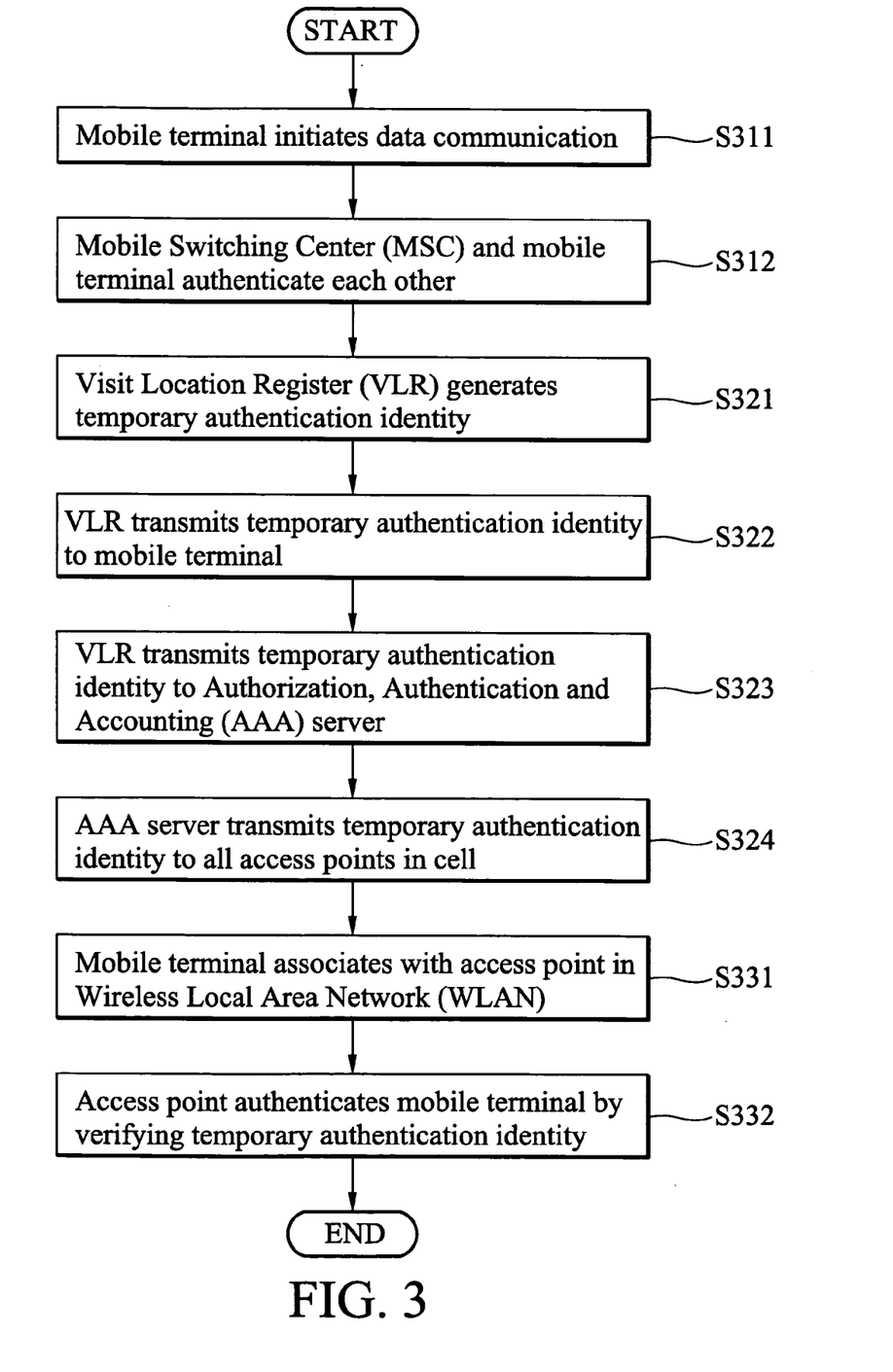
FIG. 3 is a flowchart showing a method of data communication handoff according to the first embodiment of the invention.

FIG. 3 is a flowchart showing a method of data communication handoff according to the first embodiment of the invention.

First, in step S311, the mobile terminal 20 initiates a data communication with the BSS 11 in the cell 10, an authentication request 411 with an IMSI stored in a SIM card is sent to the AUC 13 via the BSS 11 and MSC 12. In step S312, the AUC 13 and mobile terminal 20 authenticate each other using CHAP.

In step S321, after successful authentication, the VLR 14 generates a temporary authentication identity applicable in the cell 20. In step S322, the VLR 14 transmits the temporary authentication identity to the mobile terminal 20 via the MSC 12, and the mobile terminal 20 stores the temporary authentication identity on the SIM card. In step S323, the VLR 14 additionally transmits the VLR address and the temporary authentication identity to the AAA server 31 via the HLR 13 and an AAA-HLR gateway (not shown). In step S324, the AAA server stores the temporary authentication identity and transmits it to access points (APs) associated with any WLAN within the cell 20.

In step S331, when the mobile terminal 20 enters a WLAN in the cell 10 and associates with an AP therein, the mobile terminal 20 sends the AP an EAPOW start message. In step S332, the AP sends an EAP request to the mobile terminal 20 for temporary authentication identity, and the mobile terminal 20 sends an EAP response with temporary authentication identity stored in the SIM card to the AP. An EAP success message is sent to the mobile terminal 20 upon successfully verifying the temporary authentication identity of the mobile terminal 20 with that received from the VLR 14.

Figure 4:
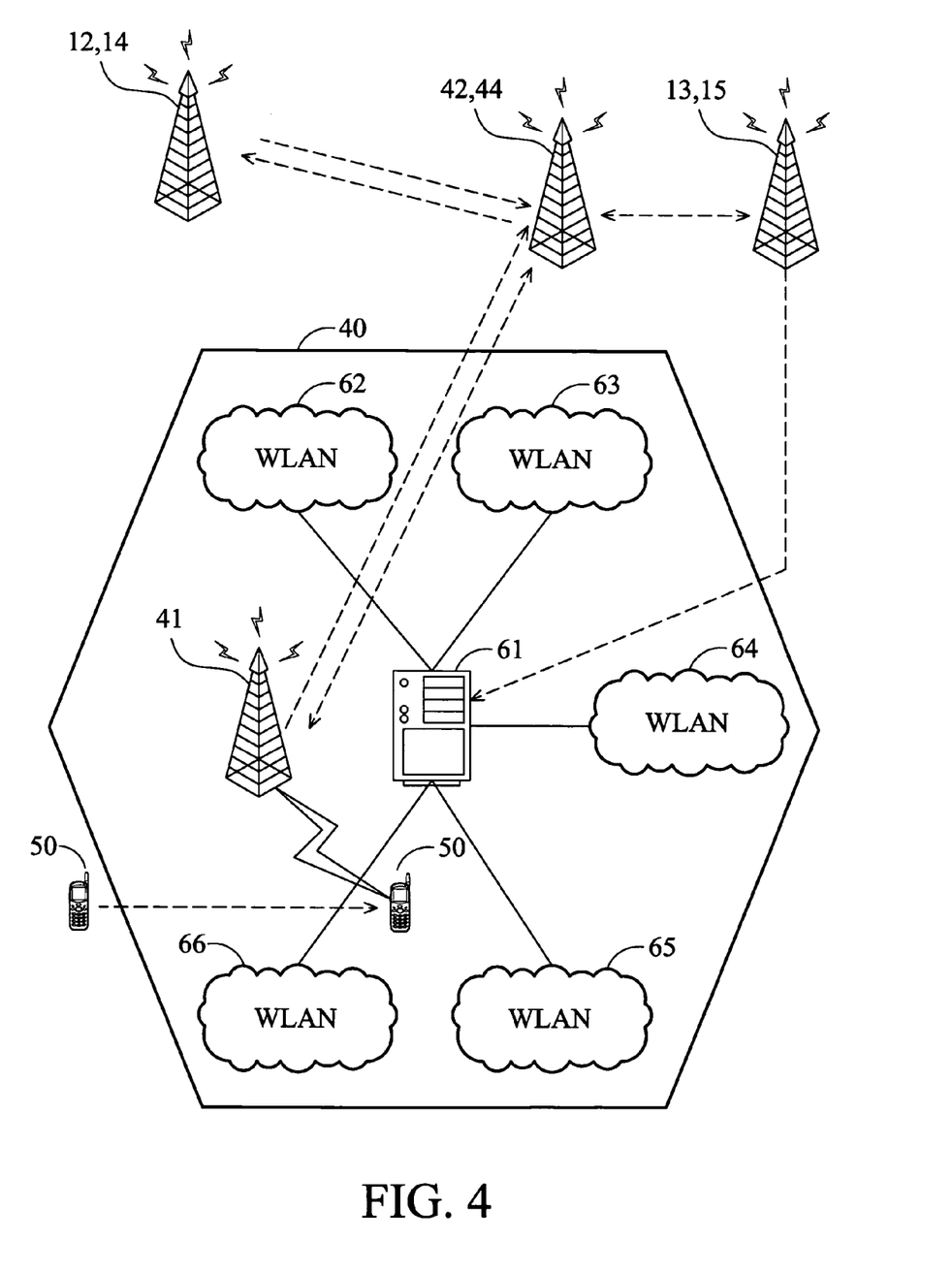
FIG. 4 is an architecture diagram of a hybrid wireless communication environment according to the second embodiment of the invention.

Following the first embodiment of the invention, a second embodiment of the invention discloses a data communication handoff system and method thereof in a hybrid wireless communication environment when a mobile terminal hands off a data communication from the BSS 11 to another BSS. FIG. 4 is an architecture diagram of a hybrid wireless communication environment according to the second embodiment of the invention. The environment comprises the BSS 41, an AAA server 61, WLANs, ranging from 62 to 66, MSCs 12, 42, VLRs 14, 44, the HLR 13 and the AUC 15. The WLANs are located in the cell 40. The BSS 41 familiar with the BSS 11 comprises a BTS and a BSC and handles data communication in the cell 40. The MSC 42 performs various telephony switching functions in the cell 40. The VLR database contains temporary information about subscribers required by the MSC 42 in order to service visiting subscribers. When a mobile station 20 roams into the MSC area, the VLR 44 connected to the MSC 42 requests data about the mobile station 20 from the VLR 14. The AAA server 61 storing information regarding WLANs located in the cell 40.

Figure 5:
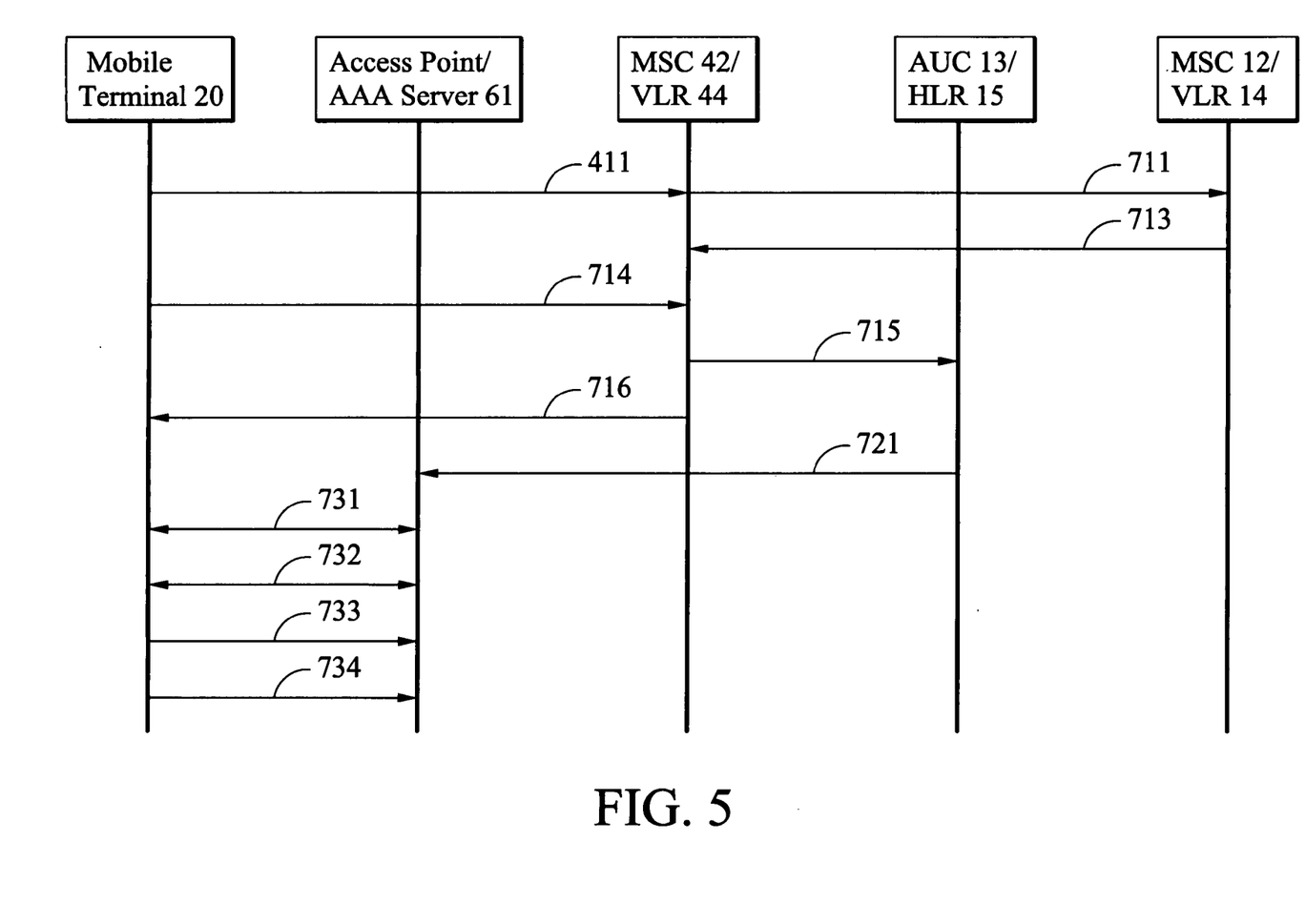
FIG. 5 is a communication sequence diagram of a hybrid wireless communication environment according to the second embodiment of the invention.

In order to smooth hand off a data communication from a wireless telephony network to a WLAN without disrupting the data connection, the second embodiment also discloses a pre-authentication mechanism to reduce the authentication time. FIG. 5 is a communication sequence diagram of a hybrid wireless communication environment according to the second embodiment of the invention. When the mobile terminal 20 hands off the data communication from the BSS 11 to the BSS 41 in the cell 40, an authentication request 611 with the prior received temporary authentication identity stored in a SIM card is sent to the MSC 12 via the MSC 42. The MSC 12 transmits authentication information 613 with an IMSI corresponding to the mobile terminal 20, and a plurality of RANDs and SRESs to the MSC 42 for authentication. The mobile terminal 20 and the MSC 42 use CHAP 614 to authenticate each other. After the authentication is successful, the VLR 44 generates a new temporary authentication identity only valid in the cell 40. The association between the IMSI and the new temporary authentication identity is stored in the VLR 44. The VLR 44 transmits a message 616 comprising the new temporary authentication identity to the mobile terminal 20 via the MSC 42, and the mobile terminal 20 stores the new temporary authentication identity on the SIM card. The VLR 44 additionally transmits a message 615 comprising the VLR address and the new temporary authentication identity to the HLR 13 via the MSC 42. The HLR 15 transmits a message 621 comprising the new temporary authentication identity to the AAA server 61 for pre-registration via an AAA-HLR gateway (not shown), and the AAA server 61 stores the new temporary authentication identity and transmits the new temporary authentication identity to access points (APs) associated with any WLAN within the cell 40.

Upon the mobile terminal 20 enters a WLAN in the cell 40 and associates with an AP therein, the mobile terminal 20 sends the AP an EAPOW start message 631. The AP sends an EAP request 632 to the mobile terminal 20 for temporary authentication identity, and the mobile terminal 20 sends an EAP response 632 with new temporary authentication identity to the AP. An EAP success message 633 is sent to the mobile terminal upon successfully verifying the new temporary authentication identity of the mobile terminal 20 with that of the VLR 44.

Figure 6:
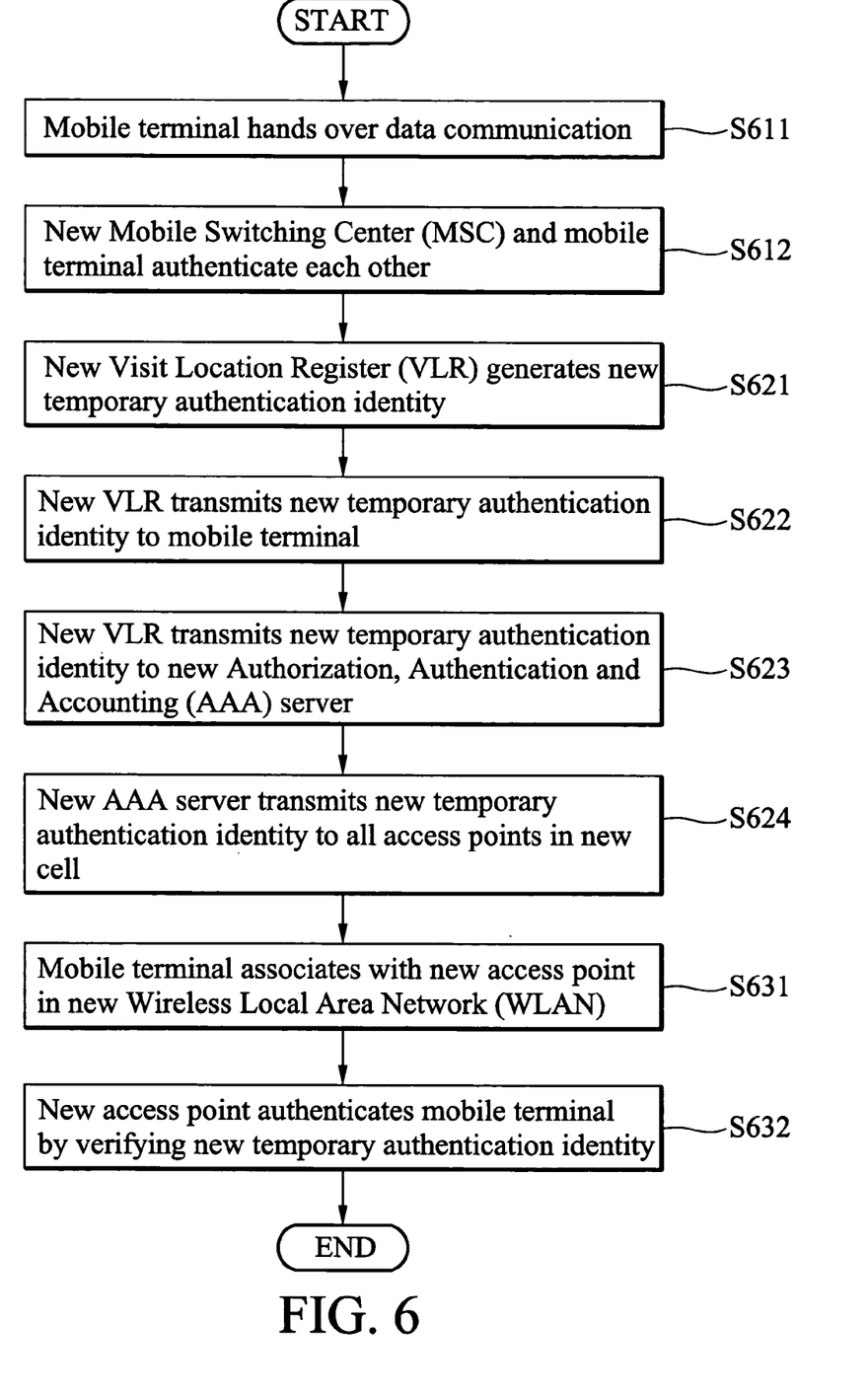
FIG. 6 is a flowchart showing a method of data communication handoff according to the second embodiment of the invention.

FIG. 6 is a flowchart showing a method of data communication handoff according to the second embodiment of the invention.

First, in step S611, the mobile terminal 20 hands over the data communication from the BSS 11 to the BSS 41 in the cell 40, an authentication request 711 with the temporary authentication identity stored in a SIM card is sent to the MSC 12 via the BSS 41 and MSC 42, and authentication information 713 with the IMSI corresponding to the mobile terminal 20, and a plurality of RANDs and SRESs is sent to the MSC 42. In step S612, the MSC 42 and mobile terminal 20 authenticate each other using CHAP 714.

In step S621, after successful authentication, the VLR 44 generates a new temporary authentication identity applicable in the cell 40. In step S622, the VLR 44 transmits the new temporary authentication identity to the mobile terminal 20 via the MSC 42, and the mobile terminal 20 stores the new temporary authentication identity on the SIM card. In step S623, the VLR 44 additionally transmits the VLR address and the new temporary authentication identity to the AAA server 61 via the HLR 13 and an AAA-HLR gateway (not shown). In step S624, the AAA server stores the new temporary authentication identity and transmits it to access points (APs) associated with any WLAN within the cell 40.

In step S631, when the mobile terminal 20 enters a WLAN in the cell 40 and associates with an AP therein, the mobile terminal 20 sends the AP an EAPOW start message. In step S632, the AP sends an EAP request to the mobile terminal 20 for a new temporary authentication identity, and the mobile terminal 20 sends an EAP response with the new temporary authentication identity stored in the SIM card to the AP. An EAP success message is sent to the mobile terminal 20 upon successfully verifying the new temporary authentication identity of the mobile terminal 20 with that received from the VLR 44.

The system and method of this invention provide a pre-authentication mechanism for performing complicated authentication procedures while a mobile terminal associates with a BSS, enabling the mobile terminal to hand off the data communication from a wireless telephony network to a WLAN within the same cell, with reduced authentication time.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of data communication handoff, comprising:
a wireless telephony network comprising a base station system (BSS) and a visit location register (VLR) corresponding to the BSS, wherein the BSS manages data communication in a cell, and the VLR generates a temporary authentication identity applicable only in the cell when a mobile terminal is successful authentication for data communication via the wireless telephony network, and transmits the temporary authentication identity to the mobile terminal; and
a wireless local area network (WLAN) located in the cell comprises a access point, wherein the access point receives the temporary authentication identity from the wireless telephony network before the mobile terminal associates with the access point, and authenticates the mobile terminal by verifying the temporary authentication identity for data communication via the WLAN upon the mobile terminal associates with the access point.

2. The system as claimed in claim 1 wherein the WLAN further comprises an authentication, authorization and accounting (AAA) server storing information regarding the WLAN located in the cell.

3. The system as claimed in claim 1 wherein the temporary authentication identity comprises a temporary mobile subscriber identity (TMSI).

4. The system as claimed in claim 3 wherein the temporary authentication identity comprises a temporary mobile subscriber identity (TMSI).

5. The system as claimed in claim 1 wherein the wireless telephony network further comprises a home location register (HLR), and the WLAN further comprises an authentication, authorization and accounting (AAA) server and a HLR-AAA gateway.

6. The system as claimed in claim 5 wherein the temporary authentication identity is transmitted to the access point via the HLR, the HLR-AAA gateway and the AAA server.

7. The system as claimed in claim 6 wherein the temporary authentication identity comprises a temporary mobile subscriber identity (TMSI).

8. The system as claimed in claim 2 wherein the wireless telephony network further comprises a home location register (HLR), and the WLAN further comprises a HLR-AAA gateway.

9. The system as claimed in claim 8 wherein the temporary authentication identity is transmitted to the access point via the HLR, the HLR-AAA gateway and the AAA server.

10. The system as claimed in claim 9 wherein the temporary authentication identity comprises a temporary mobile subscriber identity (TMSI).

11. A method of data communication handoff, utilized in a wireless telephony network and a wireless local area network (WLAN) performing the steps of:
generating a temporary authentication identity applicable in a local cell, with a visit location register (VLR) when a mobile terminal is successful authentication for data communication via the wireless telephony network, wherein the VLR within the wireless telephony network;
transmitting the temporary authentication identity to the mobile terminal;
receiving the temporary authentication identity with an access point within the WLAN from the wireless telephony network before the mobile terminal associates with the access point; and
authenticating the mobile terminal by verifying the temporary authentication identity for data communication via the WLAN upon the mobile terminal associates with the access point.

12. The method as claimed in claim 11 wherein the temporary authentication identity comprises a temporary mobile subscriber identity (TMSI).

13. The method as claimed in claim 11 wherein the step of receiving the temporary authentication identity, the temporary authentication identity is transmitted via a home location register (HLR), an authentication, authorization and accounting (AAA) server and a HLR-AAA gateway, the HLR being within the wireless telephony network, and both the AAA server and the HLR-AAA gateway being within the WLAN.

14. The method as claimed in claim 13 wherein the temporary authentication identity comprises a temporary mobile subscriber identity (TMSI).

* * * * *